Patented Mar. 21, 1939

2,151,252

UNITED STATES PATENT OFFICE

2,151,252

ALKYL HALIDES CONTAINING A QUATERNARY CARBON ATOM

Frank C. Whitmore, State College, Pa., and August H. Homeyer, St. Louis, Mo., assignors to Mallinckrodt Chemical Works, St. Louis, Mo., a corporation of Missouri No Drawing. Application August 14, 1935, Serial No. 36,132

8 Claims. (Cl. 260—652)

This invention relates to alkyl halides, and with regard to certain more specific features, to alkyl halides which include a quaternary carbon atom in their structure, and which correspond generally to the type formula:

$$R_3C-(CH_2)_n-CHY-CH_2X$$

where R indicates an alkyl, $n$ is equal to or greater than 1, Y is hydrogen or a halogen, and X is a halogen.

This application is in part a continuation of part of the application of the present applicant Whitmore, together with Walter R. Trent, Serial No. 666,510, filed April 17, 1933, now Patent No. 2,022,485, dated November 26, 1935.

Among the several objects of the invention may be noted the provision of a series of substances corresponding generally to the type-formula above given, and of processes of making the same which may be carried out upon commonly obtainable materials and with a minimum of complicated procedures; and the provision of a series of substances which are readily reactive as intermediates in the preparation of several pharmaceutical and other products. Other objects will be in part obvious and in part pointed out hereinafter.

The invention accordingly comprises the elements and combinations of elements, steps and sequence of steps, and features of composition and synthesis, which will be exemplified in the products and processes hereinafter described, and the scope of the application of which will be indicated in the following claims.

As set forth in several copending applications for Letters Patent of the same assignee, it has recently been determined that certain organic products including as a constituent thereof a quaternary carbon atom, that is, a carbon atom linked to four other carbon atoms, in a compound containing seven or more carbon atoms, such as represented by the type formula:

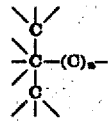

have valuable properties, particularly in the field of hypnotics, sedatives, soporifics, analgesics, bactericides, and the like. This arrangement, whereby one carbon atom is linked to four other carbon atoms, will hereinafter be referred to as the "neocarbinyl" arrangement.

One of the most valuable series of intermediates for the preparation of these neocarbinyl-including substances comprises the series of neocarbinyl halides, which are represented generically by the type formula first above given. The member of the series comprising 4,4-dimethyl-1-bromopentane, for example, combines with barbituric acid and its derivatives to yield substituted barbituric acids which have greatly improved hypnotic and soporific powers. The same member readily combines with substances such as malonic or other esters, and their derivatives, yielding products which are reducible to long-chain neocarbinyl acids, which are bactericidal, and which promise to be particularly efficacious in the treatment of leprosy. Higher homologs of the series react similarly.

Example 1

The member of the series just mentioned, namely, 4,4-dimethyl-1-bromopentane, is the simplest substance falling within the type formula given. From its structure, $$(CH_3)_3C-CH_2-CH_2-CH_2Br$$

it will be seen that each of the three R's is a methyl, $n$ is 1, Y is hydrogen, and X is bromine. This substance may be prepared in the following manner:

Tertiary butyl chloride, which may be commercially obtained is considered as the starting material. This tertiary butyl chloride is first converted into the corresponding Grignard reagent (tertiary butyl magnesium chloride) by treatment with magnesium metal turnings in ether in the well-known manner, the reaction being:

$$(CH_3)_3CCl+Mg \rightarrow (CH_3)_3CMgCl$$

The Grignard compound is now treated with allyl bromide, $BrCH_2CH=CH_2$, which is commercially obtainable, and a new olefine is obtained, the reaction being:

$$(CH_3)_3CMgCl+BrCH_2CH=CH_2 \rightarrow$$
$$(CH_3)_3C-CH_2-CH=CH_2$$

the product being named as 4,4-dimethylpentene-1. This olefine is then preferably purified.

To the purified olefine, dry hydrogen bromide is added to obtain the desired product, 4,4-dimethyl-1-bromopentane, according to the following reaction:

$$(CH_3)_3C-CH_2-CH=CH_2+HBr \rightarrow$$
$$(CH_3)_3C-CH_2-CH_2-CH_2Br$$

This addition takes place contrary to the principles known as Markownikoff's rule, which would presuppose that the bromine, on adding, would attach to the fourth carbon atom of the chain instead of to the fifth. However, numerous check determinations have been made, and it is definitely established that the bromine does add in the manner indicated by the reaction above.

Proceeding specifically along the above-indicated lines, the desired bromide may be made in the following manner:

Details for the preparation of the Grignard compound are not given, as this is a customary procedure in organic syntheses.

Starting, then, with an ether solution of the Grignard compound, tertiary butyl magnesium chloride, the following procedure may be utilized:

605 grams of allyl bromide and 500 cc. of dry ethyl ether are placed in a three-neck flask equipped with a mechanical stirrer, a separatory funnel, and a thermometer. The mixture is cooled by ice and salt, and tertiary butyl magnesium chloride solution, which has been carefully filtered, is added at such a rate that the temperature remains near zero. A total of 2400 cc. of the Grignard reagent, which has a concentration of 2.2 mols per liter, is added during twenty-four hours. After warming to 30° C. for an hour, with stirring, the liquid is siphoned off into a funnel containing crushed ice. However, the magnesium halide ether complex forms a solid cake within the flask, so this is loosened with a stirring rod, slurried with ether, and added to the contents of the funnel. The ether layer is then separated from the water and washed with an ammoniacal solution of ammonium sulphate. The combined water layer and washings are steam distilled and the ether layer thus obtained is added to the main ether portion. The combined ether portions are then dried over calcium chloride, and fractionated, the portion boiling between 68° C. and 71.2° C., at atmospheric pressure, being collected as the product, 4,4-dimethylpentene-1. The amount collected is 419 grams, or a yield of 86% based upon the allyl bromide used. The product is a colorless liquid, having an index of refraction between 1.3902 and 1.3920.

The above olefine, before proceeding further, may be purified in the following manner: First, the olefine is converted into its dibromide with bromine in an ether or chloroform solution at —5° C. The dibromide is then fractionated at a reduced pressure, and the fraction from 77° C. to 78° C. (at 9 mm. pressure) is collected. The olefine is then regenerated by allowing the dibromide to flow drop-wise into a refluxing arrangement including a stirred suspension of zinc dust in ethyl alcohol, at boiling temperature. After this, the olefine is removed by usual methods from the alcoholic solution. The yield is greater than 90%. This procedure is particularly valuable for removing diallyl and other impurities from the crude olefine. The pure olefine has a boiling point of 72.35° C. at 760 mm. pressure, an index of refraction of 1.3911, and a density of 0.6827.

However, the olefine need not necessarily be purified at this stage.

50 grams of the purified (or unpurified) 4,4-dimethylpentene-1 are next saturated at 0° C. with hydrogen bromide prepared from bromine and tetralin and dried by passing over red phosphorus and phosphoric anhydride. On the following day the flask is heated to boiling under 70 mm. pressure to remove the excess hydrogen bromide, but with a refluxing arrangement to prevent loss of the product. A little anhydrous potassium carbonate is then added, and the product fractionated at reduced pressure (about 34 to 37 mm.). The boiling point of the product (2,2-dimethyl, 5-bromo pentane) thus obtained, over the varying pressure noted, is 70 to 71° C., or about 154° C. under 730 mm. pressure. The product is a colorless oily liquid, its density being determined as about 1.1343, while its index of refraction is about 1.4484. Using these values, the molecular refraction of the product is determined to be 42.29. The theoretical value for the product is 42.29, a perfect check.

The molecular refraction determined as above establishes that no polybromide has been obtained. The product thus comprises a monobromide, which might be either primary, secondary, or tertiary. The possibility of tertiary bromide is negatived by an attempted hydrolysis of the substance with water, and titration of the mixture with sodium hydroxide, only 3 drops of 0.18 N.NaOH being required for 1.8672 grams of the bromide. A further test made by shaking samples of the bromide with silver nitrate solution and then titrating with ammonium thiocyanate using ferric alum as an indicator shows no substantial amount of secondary bromide to be present. It is accordingly definitely established that the product comprises the primary bromide, or 4,4-dimethyl-1-bromopentane, even though this involves addition of the hydrogen bromide contrary to Markownikoff's rule. This structure has since been checked by more devious methods.

From the foregoing, it is seen that the desired product, 4,4-dimethyl-1-bromopentane, has been prepared in a high state of purity, as desired. The corresponding other halides may probably be prepared by substituting their respective hydrogen compounds for the hydrogen bromide in the last step of the synthesis.

*Example 2*

Another example of substances falling within the type formula given is the substance 4,4-dimethyl-1,2-dibromopentane. This substance differs from the first example only in that a bromine has replaced one of the hydrogens on the secondary carbon atom, yielding the structure:

(CH₃)₃C—CH₂—CHBr—CH₂Br wherein the Y of the type formula is now a bromine instead of hydrogen.

The method of preparing this substance has already been intimated in connection with the purification of the olefine, 4,4-dimethylpentene-1, obtained as an intermediate product in the synthesis of Example 1. It comprises, briefly, adding liquid bromine to the stated olefine, the double bond breaking with the addition of two bromine atoms. No specific directions need be given here, as the directions given in connection with Example 1 are sufficient for the preparation. The yield is about 85%, based on the olefine used.

The product, 4,4-dimethyl-1,2-dibromopentane, is a heavy liquid which boils at 77–78° C. under 9 mm. pressure, has an index of refraction of 1.4970, and a density of 1.5129. Its calculated molecular refraction from these data is 49.89, which is a substantial correspondence with the theoretical value 50.05.

*Example 3*

Another example of substances falling within the type formula given is the substance 5,5-dimethyl-1-bromohexane. From its structure,

(CH₃)₃C—CH₂—CH₂—CH₂—CH₂Br it will be seen that each of the three R's is a methyl, n is 2, Y is hydrogen, and X is bromine.

This substance may be prepared in the following manner:

Starting with the halide of Example 1, namely, 4,4-dimethyl-1-bromopentane, this halide is first converted into its corresponding Grignard compound with metallic magnesium. The Grignard compound is then treated with formaldehyde, yielding as a product, 5,5-dimethylhexanol-1. Upon subsequent treatment with hydrogen bromide, the —OH is replaced by —Br, giving the desired product. Specific directions follow:

From two moles of the 4,4-dimethyl-1-bromopentane, the Grignard compound is obtained in the well-known manner, in a yield of 90% or more. The Grignard compound is prepared in ether solution, with a volume of about 1250 cc. This solution is cooled in an ice-salt mixture, and while the cooling is progressing, trioxymethylene is dried by heating it for 15 minutes in a bath at 180° C. To the cooled Grignard solution, well stirred, the vapors from the dried trioxymethylene are conducted through a heated inlet tube. After 90 g. of formaldehyde have been added, a negative test for the Grignard reagent is obtained, so the mixture is poured over an ice-sulphuric acid mixture and the resulting mixture is steam distilled to obtain the product. The 90 g. of formaldehyde represents too great an excess, causing the formation of acetal, and decreasing the yield of the alcohol to about 44%. However, the acetal-containing residue may be hydrolyzed with alcoholic hydrogen chloride to recover more of the alcohol product. The product alcohol, 5,5-dimethylhexanol-1, boils at about 94° C. (under 27-30 mm. pressure), and has an index of refraction of about 1.4270.

Hydrogen bromide is generated by dropping bromine on a bath of tetraline maintained at 180-190° C. The hydrogen bromide is then dried by passing it through a tube containing red phosphorous, and then introduced into 86.2 grams (0.65 mole) of the 5,5-dimethylhexanol-1 prepared as above, which is maintained at a temperature between 98 and 105° C. The reaction is continued for about 5 hours, after which the solution is cooled. In attempting to separate the water layer, an emulsion forms which is not broken either by the addition of more water or by addition of small amounts of NaCl. It is therefore extracted with 100, 50, and 50 cc. of ether, the ether extract washed with 50 cc. of water and then three successive times with 50 cc. of 10% potassium carbonate solution, and finally dried with 20 g. of anhydrous potassium carbonate. The dried bromide was then fractionated.

The product, 5,5-dimethyl-1-bromohexane, is obtained to the extent of 64 g., a yield of 51%. It is a colorless liquid, boiling at about 84°C. under 30 mm. pressure, and has an index of refraction of 1.4495, and density of 1.1036.

*Example 4*

Another example of substances falling within the type formula given is the substance, 4,4-dimethyl-1-bromohexane. From its structure,

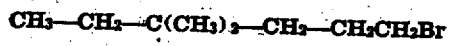

it will be seen that one R is ethyl, while the other two R's are methyls, $n$ is 1, Y is hydrogen, and X is bromine. This substance may be prepared in the following manner:

Tertiary amyl alcohol, commercially available, is used as the starting material. This is first converted into tertiary amyl chloride with hydrogen chloride. The chloride is then formed into its corresponding Grignard compound. To the Grignard compound is then added allyl bromide, resulting in the formation of an olefine, 4,4-dimethylhexene-1. The olefine, upon treatment with hydrogen bromide, in the presence of ascaridole, yields a mixture of primary and secondary bromides. The primary bromide is in the major proportion, however, again demonstrating an addition contrary to Markownikoff's rule, as in Example 1.

Since the preparation of the olefine follows substantially identically that of Example 1, using tertiary amyl chloride in place of tertiary butyl chloride, no detailed directions will here be given. The olefine, 4,4-dimethylhexene-1, boils at 103.5 to 105.2° C. under 728 to 730 mm. pressure, has an index of refraction of 1.4120 to 1.4159, and a density of 0.7236. The molecular refraction calculated from these data is 38.53, a substantial check with the theoretical value, 38.68.

Hydrogen bromide is generated by dropping liquid bromine on tetraline at 180° C. The gas is freed of bromine by passing it through a tube containing red phosphorus, and thence conducted through a trap into a 500 cc. flask containing 90 g. of the olefine, 4,4-dimethylhexene-1, and 4 g. of ascaridole. The flask is equipped with a stirrer and reflux condenser, which are operated throughout the addition. The inlet tube for the hydrogen bromide dips beneath the surface of the olefine. The flask is cooled in an ice-salt bath. After the olefine will take up no more HBr the flask is stoppered, put in the ice box for a time, and then again saturated. A typical run gave the following history:

| Time of passage of HBr into the olefine | Total HBr taken up | Time in ice box |
|---|---|---|
| Hours | Grams | Hours |
| 1 | 50 | 11 |
| 1.5 | 53 | 21 |
| 2 | 57 | 21 |
| 3 | 75 | -------- |

After completion of the reaction, the mixture in the flask is poured into 200 cc. of water, and the lower layer is separated and washed with dilute potassium carbonate solution. The water layer is extracted with 100 cc. of ether, which is combined with the first layer. The combined layers are then fractionally distilled. A rather large fraction is obtained at 78 to 81° C. (27 mm. pressure), which is the secondary bromide. The primary bromide, which is the desired product, comes over at about 84° C. (24 mm. pressure). It is a colorless liquid, having an index of refraction of 1.4581 to 1.4583 and a density of 1.1261. The molecular refraction calculated from these data is 46.78, a substantial agreement with the theoretical value, 46.91.

Hydrolysis tests with silver nitrate (and subsequent titration with ammonium sulphocyanate) showed this product to be the desired primary bromide, 4,4-dimethyl-1-bromohexane.

*Example 5*

Another substance falling within the type formula is 4,4-dimethyl-1,2-dibromohexane. From the structure of this substance,

it will be seen that it is the dibromide of Example 4, and bears the same relation to Example 4 that Example 2 bears to Example 1. It may be prepared in the same manner as Example 2, namely, by adding bromine to the olefine, 4,4-dimethylhexene-1, obtained as an intermediate product in Example 4.

*Example 6*

Another substance falling within the type formula is 6,6-dimethyl-1-bromoheptane. From the structure of this substance,

it will be seen that each of the three R's is a methyl, $n$ is 3, Y is hydrogen, and X is bromine This substance may be prepared in the following manner:

4,4-dimethyl-1-bromopentane, prepared in accordance with Example 1 of this application, is used as the starting material. This material is reacted with metallic magnesium to form its Grignard compound, which is then treated with ethylene oxide to form the compound 6,6-dimethylheptanol-1. The alcohol thus prepared is then treated with hydrogen bromide, and the desired bromide compound is thus obtained. Specific details follow:

The formation of the Grignard compound is well-known, and hence requires no particularized description.

To 200 cc. of ether cooled to 0° C., 100 g. of ethylene oxide, also at 0° C., are added. The solution is placed in a dropping funnel fitted with a spiral condenser cooled in a salt-ice mixture. This solution is then added to an ether solution of about 368 g. of the Grignard compound. The reaction flask is cooled to 0° C. in an ice-salt mixture. The time of addition is about 45 minutes, but stirring is continued for 5 hours while the temperature is allowed to rise to 10° C. The flask is then permitted to come to room temperature, and may be left for a considerable period of time. The reaction is then completed by distilling off the ether (one-third of the total volume), adding 500 cc. of dry benzene, continuing the distillation until the liquid reaches 65° C., refluxing one hour, and decomposing the mixture with 500 g. ice, 100 g. ammonium sulphate, and 100 cc. sulphuric acid. The upper layer is then separated and the aqueous layer extracted with three 200 cc. portions of ether. The combined upper layer and ether extract are then dried over potassium carbonate and the ether distilled off. The remainder is then fractionated to recover the alcohol, 6,6-dimethylheptanol-1. This substance boils at 67 to 67.5° C. under 3 mm. pressure, has an index of refraction of 1.4312, and a density of 0.8251. Its molecular refraction, calculated from these data, is 45.243, a substantial check with the theoretical value, 45.287.

160 g. of bromine and 175 g. of ice are placed in a 500 cc. flask, and sulphur dioxide is passed in for an hour to give a colorless solution. To this mixture of hydrogen bromide and sulphuric acid, 100 g. of the 6,6-dimethylheptanol-1 described above is added. Thereafter, 54 cc. of concentrated sulphuric acid is slowly added and the mixture is refluxed for 4½ hours. The resultant solution contains some tarry material which makes the separation of the upper layer difficult. After filtering, the solution is extracted with three 200 cc. portions of ether, and the ether extract is dried over calcium chloride. The product is then distilled from a little potassium carbonate. It is the desired bromide, 6,6-dimethyl-1-bromoheptane. It boils at 84 to 84.5° C. at 14 to 15 mm. pressure, has an index of refraction of 1.4523, and a density of 1.0822. The molecular refraction calculated from these data is 51.64, a substantial check with the theoretical value, 51.53.

*Further examples*

Using the bromides, the preparation of which has heretofore been described in detail as starting materials, preparing Grignard compounds therefrom, and reacting the Grignard compounds with allyl bromide (as in Examples 1 and 4), or formaldehyde (as in Example 3), or ethylene oxide (as in Example 6), with the suggested procedures for converting the resultant olefines or carbinols into halides, numerous other substances coming within the type formula may be prepared. For example, addition of allyl bromide to 4,4-dimethyl-1-bromopentane (Example 1) results in the formation of 7,7-dimethyl-1-bromo-octane.

*Example 7*

In the course of this preparation, the olefine 7,7-dimethyl-octene-1 is obtained, which, if treated with liquid bromine as in Example 2, yields 7,7-dimethyl-1,2-dibromo-octane,

*Example 8*

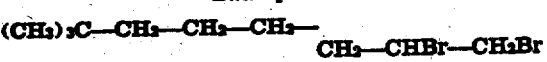

which likewise falls within the type formula. Similarly, if 4,4-dimethyl-1-bromohexane is reacted with ethylene oxide in the manner of Example 6, there is obtained the substance 6,6-dimethyl-1-bromo-octane,

*Example 9*

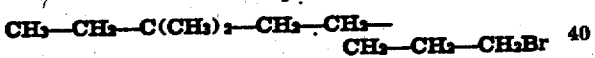

Similarly, if the same substance, 4,4-dimethyl-1-bromohexane is reacted with formaldehyde according to the manner of Example 3, there is obtained the substance 5,5-dimethyl-1-bromo-heptane,

*Example 10*

Other higher homologous halides may similarly be prepared.

It is of course obvious that halides other than the bromides may be prepared in the manner of all of the examples, or slight modifications thereof, by substituting the hydrogen bromide, or bromine, with the other hydrogen halides or halogens, as the case may be.

Throughout this specification, temperatures are given in degrees centigrade, pressures in millimeters of mercury, indices of refraction at 20° C. with respect to the sodium-D line commonly designated as "$n_D^{20}$"

and densities at 20° C., as compared with water at 4° C.

commonly designated as "$D_4^{20}$"

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

We claim:

1. An alkyl halide corresponding to the type formula:

$$R_3C—(CH_2)_n—CHY—CH_2X$$

wherein R indicates a lower alkyl, $n$ is equal to or greater than 1, Y is an element selected from the group composed of hydrogen and the halogens, and X is a halogen.

2. An alkyl halide corresponding to the type formula:

$$R_3C—(CH_2)_n—CH_2—CH_2X$$

wherein R indicates a lower alkyl, $n$ is equal to or greater than 1, and X is a halogen.

3. An alkyl halide corresponding to the type formula:

$$R—C(CH_3)_2—(CH_2)_n—CHY—CH_2X$$

wherein R indicates an alkyl selected from the group composed of methyl and ethyl, $n$ is equal to or greater than 1, Y is an element selected from the group composed of hydrogen and the halogens, and X is a halogen.

4. An alkyl halide corresponding to the type formula:

$$R—C(CH_3)_2—(CH_2)_n—CH_2—CH_2X$$

wherein R indicates an alkyl selected from the group composed of methyl and ethyl, $n$ is equal to or greater than 1 but not more than 4, and X is a halogen.

5. 4,4-dimethyl-1-bromopentane.
6. 4,4-dimethyl-1,2-dibromopentane.
7. 4,4-dimethyl-1-bromohexane.
8. An alkyl halide corresponding to the type formula:

$$R—C(CH_3)_2—(CH_2)_n—CHY—CH_2Br$$

wherein R indicates an alkyl selected from the group composed of methyl and ethyl, $n$ is equal to or greater than 1, and Y is an element selected from the group composed of hydrogen and bromine.

FRANK C. WHITMORE.
AUGUST H. HOMEYER.

---

Certificate of Correction

Patent No. 2,151,252.  March 21, 1939.

FRANK C. WHITMORE, ET AL.

It is hereby certified that error appears in the printed specification of the above numbered patent requiring correction as follows: Page 1, first column, lines 43 to 47 inclusive, strike out the formula and insert instead the following—

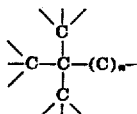

page 4, second column, line 62, for "commonly designated as '$n_D^{20}$'" read (*commonly designated as "$n_D^{20}$"*); line 65, for "commonly designated as '$D_4^{20}$'" read (*commonly designated as "$D_4^{20}$"*); and that the said Letters Patent should be read with this correction therein that the same may conform to the record of the case in the Patent Office.

Signed and sealed this 2nd day of May, A. D. 1939.

(Seal)

Henry Van Arsdale
*Acting Commissioner of Patents.*

We claim:

1. An alkyl halide corresponding to the type formula:

$$R_3C-(CH_2)_n-CHY-CH_2X$$

wherein R indicates a lower alkyl, $n$ is equal to or greater than 1, Y is an element selected from the group composed of hydrogen and the halogens, and X is a halogen.

2. An alkyl halide corresponding to the type formula:

$$R_3C-(CH_2)_n-CH_2-CH_2X$$

wherein R indicates a lower alkyl, $n$ is equal to or greater than 1, and X is a halogen.

3. An alkyl halide corresponding to the type formula:

$$R-C(CH_3)_2-(CH_2)_n-CHY-CH_2X$$

wherein R indicates an alkyl selected from the group composed of methyl and ethyl, $n$ is equal to or greater than 1, Y is an element selected from the group composed of hydrogen and the halogens, and X is a halogen.

4. An alkyl halide corresponding to the type formula:

$$R-C(CH_3)_2-(CH_2)_n-CH_2-CH_2X$$

wherein R indicates an alkyl selected from the group composed of methyl and ethyl, $n$ is equal to or greater than 1 but not more than 4, and X is a halogen.

5. 4,4-dimethyl-1-bromopentane.
6. 4,4-dimethyl-1,2-dibromopentane.
7. 4,4-dimethyl-1-bromohexane.
8. An alkyl halide corresponding to the type formula:

$$R-C(CH_3)_2-(CH_2)_n-CHY-CH_2Br$$

wherein R indicates an alkyl selected from the group composed of methyl and ethyl, $n$ is equal to or greater than 1, and Y is an element selected from the group composed of hydrogen and bromine.

FRANK C. WHITMORE.
AUGUST H. HOMEYER.

---

Certificate of Correction

Patent No. 2,151,252.                                March 21, 1939.

FRANK C. WHITMORE, ET AL.

It is hereby certified that error appears in the printed specification of the above numbered patent requiring correction as follows: Page 1, first column, lines 43 to 47 inclusive, strike out the formula and insert instead the following—

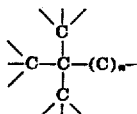

page 4, second column, line 62, for "commonly designated as '$n_D^{20}$'" read (*commonly designated as "$n_D^{20}$"*); line 65, for "commonly designated as '$D_4^{20}$'" read (*commonly designated as "$D_4^{20}$"*); and that the said Letters Patent should be read with this correction therein that the same may conform to the record of the case in the Patent Office.

Signed and sealed this 2nd day of May, A. D. 1939.

(Seal)

Henry Van Arsdale
*Acting Commissioner of Patents.*